United States Patent
Koch et al.

(10) Patent No.: US 6,168,740 B1
(45) Date of Patent: Jan. 2, 2001

(54) PARTIAL CRYSTALLIZATION METHOD OF AMORPHOUS PLASTIC ARTICLES

(75) Inventors: Michael Koch, King City; Robert D. Schad, Toronto; Laura Martin, Brampton; James D. Sykes, Orangeville; Dan Stracovsky, Etobicoke; Bruce Catoen, Georgetown, all of (CA)

(73) Assignee: Husky Injection Molding Systems Ltd.(CA)

( * ) Notice: Under 35 U.S.C. 154(b), the term of this patent shall be extended for 0 days.

(21) Appl. No.: 09/057,883

(22) Filed: Apr. 9, 1998

Related U.S. Application Data

(60) Provisional application No. 60/043,703, filed on Apr. 16, 1997.

(51) Int. Cl.[7] .............................. B29C 71/00; B29C 35/02
(52) U.S. Cl. ..................... 264/237; 264/241; 264/255; 264/327; 264/328.14; 264/348; 264/908; 264/520; 264/521; 425/548
(58) Field of Search ...................................... 264/327, 908, 264/520, 521, 241, 255, 237, 348, 519, 328.14; 451/526, 548

(56) References Cited

U.S. PATENT DOCUMENTS

| | | | |
|---|---|---|---|
| 4,177,238 | * 12/1979 | Allen ..................................... | 264/328 |
| 4,431,398 | * 2/1984 | Aoki ..................................... | 425/526 |
| 4,564,497 | * 1/1986 | Ota et al. ............................. | 264/521 |
| 4,966,544 | * 10/1990 | Mitake ................................. | 425/552 |
| 5,040,963 | * 8/1991 | Beck et al. ........................... | 425/130 |
| 5,445,784 | * 8/1995 | Sugiura et al. ...................... | 264/521 |
| 5,498,150 | * 3/1996 | Check ................................... | 425/526 |
| 5,804,016 | * 9/1998 | Schmidt et al. ..................... | 264/241 |

FOREIGN PATENT DOCUMENTS

| | | | |
|---|---|---|---|
| 54-071166 | * 6/1979 | (JP) . | |
| 55-014278 | * 1/1980 | (JP) ................................. | 264/327 |
| 56-078943 | * 6/1981 | (JP) ................................. | 264/521 |
| 57-163538 | * 10/1982 | (JP) ................................. | 264/521 |
| 58-092535 | * 6/1983 | (JP) ................................. | 264/908 |
| 60-159008 | * 8/1985 | (JP) ................................. | 264/908 |
| 5-77310 | * 3/1993 | (JP) ................................. | 264/908 |

* cited by examiner

*Primary Examiner*—Jan H. Silbaugh
*Assistant Examiner*—Suzanne E. McDowell
(74) *Attorney, Agent, or Firm*—Bachman & LaPointe, P.C.

(57) ABSTRACT

A plastic article is formed in an injection mold by injecting molten plastic into the injection mold at an elevated temperature, cooling the plastic from the molten condition to a solid condition, and crystallizing a portion of the plastic by slowing down the cooling of said portion.

14 Claims, 10 Drawing Sheets

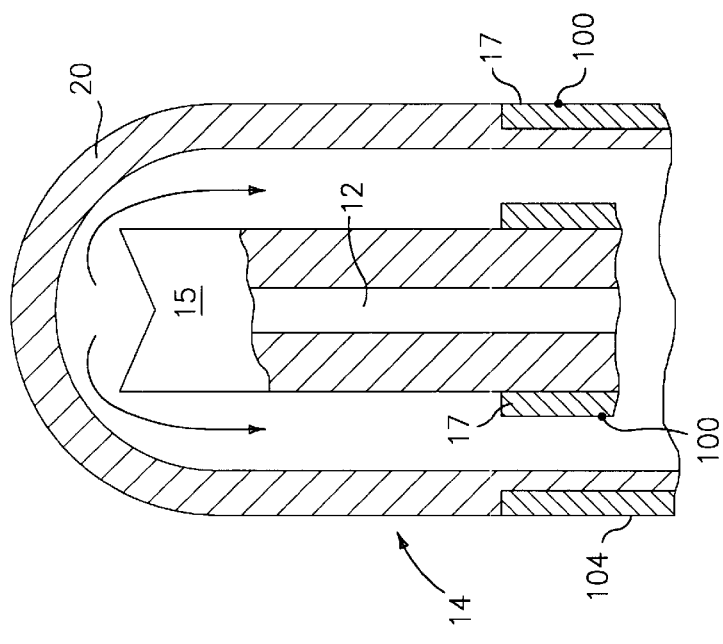
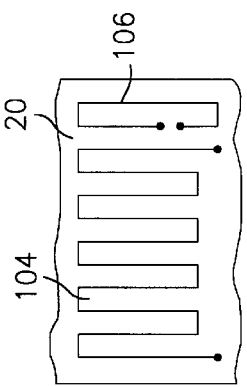
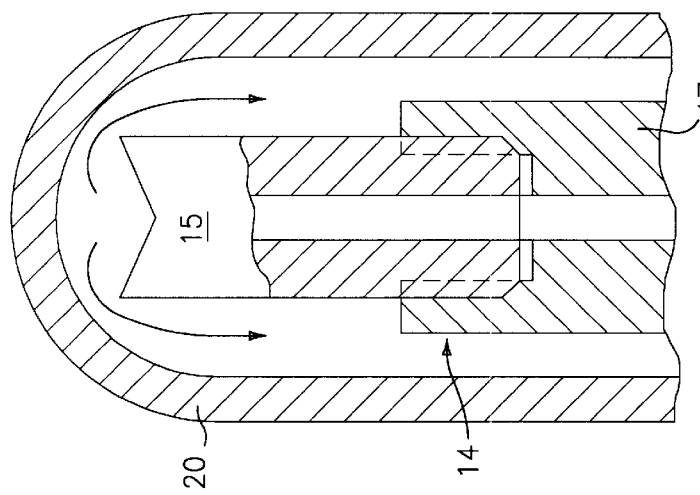
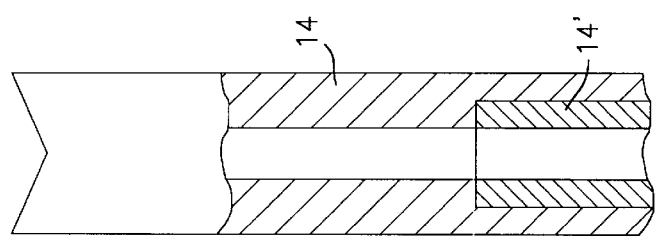
FIG. 2A  FIG. 2B  FIG. 2C  FIG. 2D  FIG. 2E

PARTIAL CRYSTALLIZATION METHOD OF AMORPHOUS PLASTIC ARTICLES

CROSS-REFERENCE TO RELATED APPLICATION

This application claims the benefit of Provisional Application Ser. No. 60/043,703, filed Apr. 16, 1997.

BACKGROUND OF THE INVENTION

This invention relates to a method and apparatus for forming an injection molded plastic article having amorphous and crystallized portions generated from the melt phase of the plastic resin as well as a novel molded plastic article. More particularly, the invention relates to a novel partial crystallization method and apparatus conducted entirely or partially inside a mold which is particularly applied to the injection molding of novel polyethylene terephthalate (PET) preforms having a crystallized neck portion and an amorphous body portion. This type of preform is further blown into a biaxially oriented container with improved strength properties in the desired crystallized area. The invention is applicable to preforms made of a single or multiple materials. The previous injection and blow molding methods for PET preforms show crystallized portions generated from the glass phase by local heating and then cooling. The present invention teaches a preferential cooling temperature pattern applied when the article is in a melt phase whereby an amorphous portion is created by rapid local cooling and a crystallized portion is created by a relatively slower local cooling.

Preferentially, the present invention uses novel designs of the PET preform molding and handling equipment. The present invention can also form other kinds of plastic articles exhibiting areas of different physical or optical characteristics. A preferred example in this regard is represented by innovative information carrier plastic discs that have a central hole, such as the HD's, CD's, DVD's, MOP's and CD-ROM's which have a central area without retrievable information. Especially the CD's and DVD's withstand critical manipulations in use and thus have to have enhanced strength and stiffness characteristics in their central portion. Even higher strength and stiffness characteristics are essential for injection molded precision and high torque resistant plastic gears actuated by rotation shafts.

It is well known that polyethylene terephthalate (PET) blown articles exhibit biaxial-orientation and thus have excellent properties which make them suitable for many applications. However, the biaxial orientation of a hollow shaped article has the disadvantage of strongly increasing the internal stress, thereby causing a reduction of dimensional stability under heat in excess of 70° C. Of critical importance in many packaging applications is the neck portion of a container which is not biaxially oriented during the blow-molding process and thus is weaker than the rest of the part. One common solution to strengthen the neck portion of an amorphous PET parison or bottle is to crystallize the neck portion by local heating at a temperature of more than 140° C., where a rapid spherullitic crystallization of the non-oriented amorphous material occurs. Many attempts have been made to improve the strength of the neck portion of PET blown bottles by local reheating of the preform or of the bottle, after injection molding of a blowable PET parison. Reference is made in this regard to U.S. Pat. No. 4,375,442 to Ota, U.S. Pat. No. 4,589,559 to Hayashi, U.S. Pat. No. 4,928,835 to Collette, U.S. Pat. No. 4,933,135 to Horwege, U.S. Pat. No. 5,180,893 to Sugiyama and U.S. Pat. No. 5,248,533 to Sugiura. In all these approaches, a heating source is directed towards the neck portion of a molded preform which is heated to a temperature necessary for its crystallization and heat set. A different approach to form a preform with a crystallized neck is disclosed in EP 503086 to Orimoto et al. In this case, a molded neck finish is first molded and then crystallized outside the mold and then located in a second mold as an insert to form a complete parison by an overmolding method.

Crystallization of the neck finish of a molded parison or a molded neck from glass does not represent an optimum method because it represents an additional, time consuming step to make a heat resistive blown article. Furthermore, it requires additional equipment and floor space and is highly energy inefficient. In most cases, the reheated and crystallized neck does not preserve its nominal dimensions.

Attempts have been made in the past to control crystallization in thermoplastic plastic materials during the injection molding process by varying the pressure on the thermoplastic material in a controlled manner during the cooling cycle. This method, disclosed for example in U.S. Pat. No. 4,150,079 to Chang, is hardly implementable when it comes to crystallize only a limited portion of the article, as is the case with the neck portion of a preform.

Partial crystallization has been also applied to vacuum thermoformed articles, as disclosed in the PCT application WO 88/09298 to Clarke. Clarke '09298 fairly describes a vacuum mold or press for shaping a flat blank of molded PET into a food container with reinforced areas. The mold of Clarke has local heaters, local coolers and local thermal insulators to induce crystallized and amorphous areas of the already flat blank. Clarke '09298 mold does not receive molten PET and does not use preferential cooling/heating of a molten material to form crystallized patterns. Therefore his method is not applicable to the injection molding of partially crystallized articles, such as PET preforms, by selective cooling from melt.

In-mold local crystallization during normal cooling has been disclosed in U.S. Pat. No. 4,307,137 to Ota. The subject matter of the '137 patent is to create a visible difference in the body of a blown preform by creating an opalescent pattern during the in-mold cooling of molten PET when molding a preform. Thus, the '137 patent is not interested in the local increase in the strength of a preform through in-mold crystallization. Also, the '137 patent does not teach any new means to locally alter the cooling rate in a mold. What clearly appears from Ota's disclosure (see FIG. 5 and FIG. 6) is that he uses the geometry of the molded part itself to achieve partial crystallization by using any standard well known molding equipment. Ota's crystallization method is based on the inherent fact that a PET article in the molten state that has regions of variable thickness will require more time to solidify in the thick regions than in the thin regions at the same temperature. Accordingly, thick regions that resist cooling may become crystalline while the thin regions that cooled faster become amorphous during the normal cooling step of a PET melt. The '137 patent creates the thin and thick areas in a two stage overmolding process. A first article comprising variable thickness areas is molded and then used as an inner "mold" surface to form the final composite article where the second layer has corresponding thick and thin areas. During the normal cooling process the thick areas of the second outer layer have a slow cooling and thus crystallize while the thin areas of the second outer layer have a faster cooling and thus become amorphous. The crystallized areas are used as a design pattern. As mentioned before, this select cooling process of the '137 patent is achieved in a regular mold solely due to the thickness variation of the second molded layer.

The crystallization method, apparatus and article of the present invention is different from the known methods because it uses a differential cooling pattern induced by innovative molding equipment to slow down the cooling process of the resin in a substantially molten phase only in certain selected areas. This local crystallization method that provides strength enhancement can be understood from the following brief description of the polymer's behavior under heat.

SUMMARY OF THE INVENTION

Accordingly, it is a principal object of the present invention to provide an improved, injection molded plastic article and a process and apparatus for preparing same.

It is a further object of the present invention to provide an article, process and apparatus as aforesaid which includes a crystalline portion with enhanced strength properties, and an amorphous portion, especially having a crystallized neck portion.

Further objects and advantages of the present invention will appear hereinbelow.

In accordance with the present invention, the foregoing objects and advantages are readily obtained.

The process of the present invention comprises: forming a plastic article by injecting molten plastic into an injection mold at an elevated temperature; cooling the plastic in said injection mold from the molten condition to a solid condition; wherein a first portion of the plastic is rapidly cooled from the molten condition to the solid condition to form an amorphous portion, and a second portion of the plastic is slowly cooled from the molten condition to the solid condition to form a crystallized portion. Desirably, said article has a closed bottom, a sidewall portion extending from the closed bottom, and a neck region extending from the sidewall, including the step of crystallizing at least a portion of the neck region. In a preferred embodiment, the present invention includes the step of providing cooling means in the injection mold to cool said article, and insulating at least a portion of the neck region from said cooling means.

The apparatus of the present invention comprises: an injection mold having a mold cavity therein; means for injecting molten plastic into said mold cavity to form a plastic article therein; cooling means in. heat exchange relationship with said mold cavity to cool said plastic from the molten condition to the solid condition; wherein said cooling means is operative to rapidly cool a first portion of said plastic from the molten condition to the solid condition to form an amorphous portion, and including means adjacent a second portion of said plastic to permit slowly cooling said second portion from the molten condition to the solid condition to form a crystallized portion. Desirably, the article has a closed bottom, a sidewall portion extending from the closed bottom, and a neck region extending from the sidewall, wherein the means adjacent the second portion is adjacent at least a portion of the neck region. In a preferred embodiment, the means adjacent the second portion insulates at least a portion of the neck region from the cooling means.

The injection molded article of the present invention comprises: an injection molded plastic article formed by injecting molten plastic into an injection mold, wherein said article includes an amorphous first portion formed by rapidly cooling said molten plastic to the solid condition, and a crystallized second portion formed by slowly cooling said molten plastic from the molten condition to the solid condition. Desirably, the article has a closed bottom, a sidewall portion extending from the closed bottom, and a neck region extending from the sidewall, wherein at least a portion of the neck region is crystallized. In a preferred embodiment, the article is a preform.

In accordance with the present invention, the foregoing readily obtains the objectives and advantages of the present invention. Further features of and advantages of the present invention will appear hereinbelow.

BRIEF DESCRIPTION OF THE DRAWINGS

The present invention will be more readily understood from a consideration of the following drawings wherein:

FIGS. 2A–2E show variations;

DETAILED DESCRIPTION OF PREFERRED EMBODIMENTS

Figure 1:
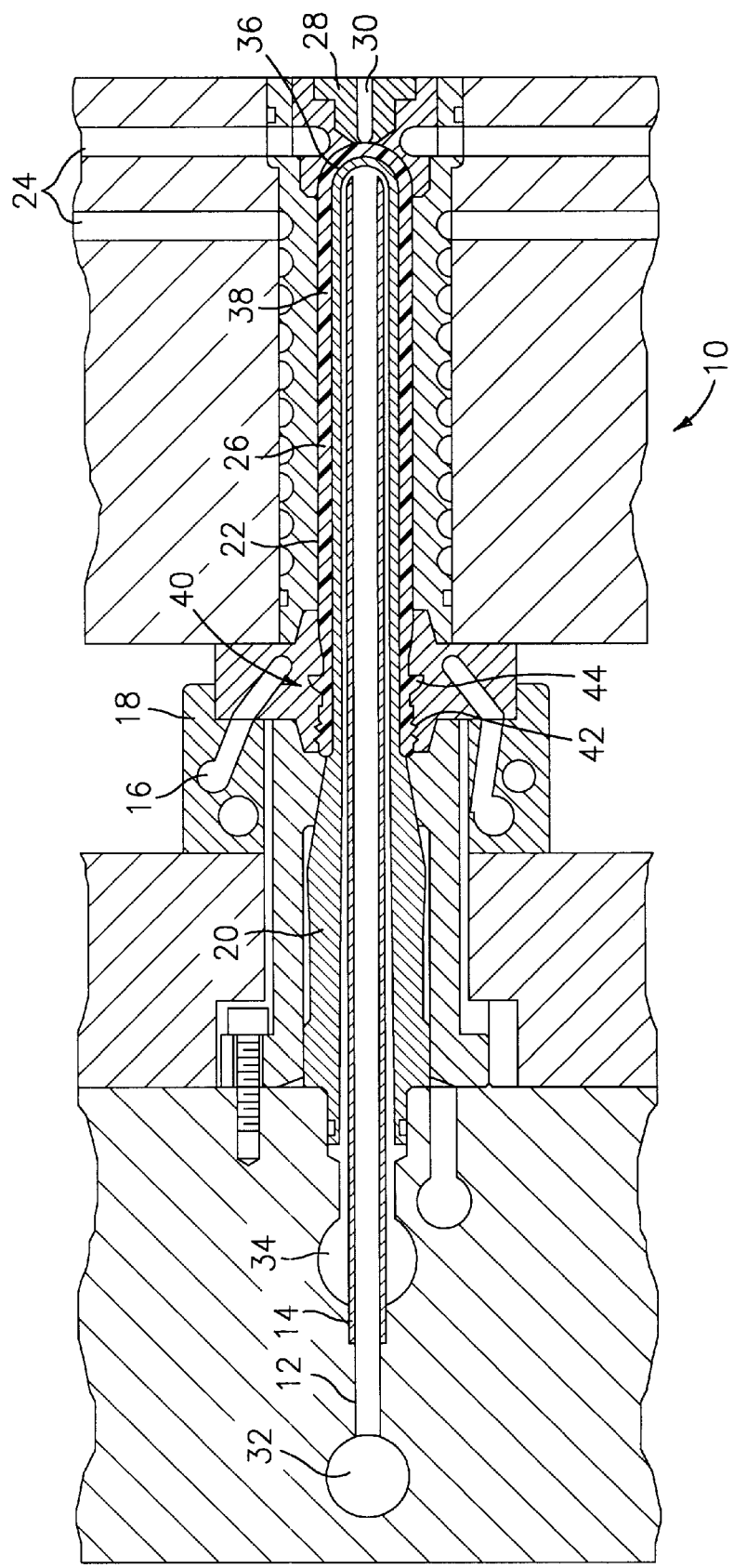
FIG. 1 is a cross-sectional view of a preform mold.

Certain commonly-used plastics, such as PET, are considered semi-crystalline polymers. The word "crystalline" refers to a region of ordered local chain arrangement, as opposed to "amorphous" where the polymer chains lack order. Melted polymer resins, by definition, are amorphous. Under ordinary conditions, polymers almost never exceed about 80% crystallinity.

In the amorphous state, polymers generally are clear and transparent. Crystallized polymers are generally opaque or translucent. The tiny crystallized regions (crystallites) scatter light, resulting in opacity or translucence. In addition, to clarity, many physical properties of polymers depend on the degree of crystallinity of the article, including solubility, stiffness, hardness and yield strength.

When semi-crystalline polymers are in an amorphous state, the configuration of the molecular chains can be compared to a tangled web of extended springs. Under certain conditions, the polymer chains tend to coil into ordered structures, forming crystalline regions. The repeating units of the polymer chain fit together neatly, forming a close-packed array which has a higher density than the amorphous state. Density measurement is commonly used to determine the degree of crystallinity.

The crystal structure has a lower energy state than the amorphous arrangement, so it is the thermodynamically favored arrangement. Because polymer molecules are long and entangled, however, the amorphous state can be "frozen in" by rapidly cooling the amorphous polymer melt. Crystallization can occur at any temperature at which the polymer chains have sufficient mobility to rearrange themselves. Crystallization can occur from the glass (by heating) or from the melt (slow cooling).

The temperature range for crystallization is between the glass transition temperature ($T_g$) and the melt temperature ($T_m$) Below $T_g$, the resin is described as being "glassy" because the mobility of the polymer chains is greatly reduced, and are essentially locked in place regardless of whether they are in an amorphous or crystalline state. Above $T_m$, the polymer chains have too much energy to form stable ordered structures, and the molten resin is amorphous. Between $T_g$ and $T_m$, the polymer chains have enough energy to rearrange themselves into the most thermodynamically favored structure, so the resin crystallizes.

The rate of isothermal nucleation and crystal growth can be described by the Avrami equation or by the related half-time of crystallization. The half-time of crystallization, $t_{1/2}$, is the time required for an amorphous sample to reach 50% of its final level of crystallinity at a given temperature. For a particular grade of polymer, $t_{1/2}$, is infinitely high above the crystalline melting point and below the glass transition temperature, and reaches some minimum point at a temperature in between. The characteristic plot of $t_{1/2}$ as a function of temperature is dependent upon the nature of the polymer including class of polymer, molecular weight, comonomers, and additives including nucleating agents and crystallization retardants.

When articles are injection molded from semi-crystalline polymers, generally the objective is to promote the maximum degree of crystallinity in order to take advantage of the attendant material property improvements. In certain applications, such as the injection molding of PET preforms for subsequent blow molding into bottles, special measures are taken to prevent the crystallization of the molded part. This is sometimes difficult to achieve, especially at the bottom part of the preform called the sprue gate, due to contact between the cooled molded material and the still hot valve stem of the hot runner nozzle.

This invention covers articles which are advantageously molded with selected regions being crystallized, and other regions being amorphous, and the molding systems and processes to make them from melt. This can be accomplished by designing the part, the thermal characteristics of the molding system and the molding process to control the heat transfer between the hot plastic and the molding system. Regions which are to be amorphous are desirably cooled as rapidly as possible. Regions which are to be crystalline are cooled more slowly through the thermal crystallization range of temperatures. Selection of polymer resins with appropriate crystallization kinetics is also necessary.

Applications of this invention include the following.

Preforms for reheat-blow molding which are amorphous in the body area and have crystallized necks, to produce bottles with higher yield strength at the neck portion. The blown preforms thus behave better for hot fill applications, for example, as the neck region becomes heat-resistant.

Articles with integral lenses or windows and frames or handles.

Articles in which the different in clarity between amorphous and crystalline regions is used to decorative advantage.

Articles in which the differing properties of the amorphous and crystalline regions is used to advantage, such as CD's and DVD's where the hole area can be strengthened by crystallization.

In the crystallized regions, the thermal energy which the polymer chains require in order to rearrange themselves from the amorphous state into crystalline regions is already present from the injection molding process and this is advantageously used selectively for the first time to create a molded part with improved strength in certain local portions. This new process is induced local crystallization from the melt, as opposed to crystallization from the glass in a cold, previously-molded article.

The final shape and dimensions of the amorphous and crystalline regions of the molded article are closely controlled by the molding surfaces of the mold, resulting in very good accuracy and repeatability.

Part design considerations which can be used to affect the heat transfer between the hot plastic and the molding system include thickness and features such as ribs or surface textures.

Mold design considerations which can be used to affect the heat transfer between the hot plastic and the molding system include:

selection of materials for the molding surfaces which have thermally insulating or conductive properties in different regions;

design of heating and/or cooling means which selectively heat and cool different regions of the mold via heat transfer fluids, including selection of materials for their thermal properties;

thermal breaks to create sharp changes in temperature; and cooling the mold as usual and incorporating heating elements in selected regions, possibly with the ability to cycle the temperature according to a predetermined pattern coinciding with the injection molding cycle and dependent upon the crystallization kinetics of the polymer.

This invention covers the concept of using and controlling the thermal energy of the molten material accumulated and retained by the molten material during the injection molding process to form a plastic article having amorphous and crystalline portions through preferential or differential cooling implemented using a dedicated novel equipment. The heat energy generated during the injection process is used totally or at least partially (as a residuum) to form crystalline portion(s) among amorphous portions. The simultaneous formation of the amorphous and crystalline portions according to this innovative concept can be implemented using several novel methods and new means. The new molding process according to this invention covers at least three new processing options and several new design concepts for each of the processing options. There is at least one common aspect for the three processing options, that is the fact that the crystallization step is initiated inside the mold and that the initial heat energy is used at least partially to induce crystallinity. The three processing methods covered by the invention are:

Initiating and finishing formation of the amorphous and crystalline portions within the mold before opening the cavity mold. This is referred as "in mold" partial crystallization.

Initiating and finishing formation of the amorphous portion within the mold before opening the cavity mold. Finishing formation of the crystalline portion initiated in the mold by using at least partially the heat generated during injection (residuum heat) after opening the mold while retaining the part by at least one mold element. This process is referred as "post form" partial crystallization. Mold element is any part of the mold that is involved in the injection molding process.

Initiating and finishing formation of the amorphous portions within the mold before opening the cavity mold. Finishing formation of the crystalline portion initiated in the mold by using at least partially the heat generated during injection (residuum heat) after opening the mold and after completely separating the molded article from any mold element. This process is referred as "out of mold" partial crystallization.

These terms are used in the description with the following meaning:
1. The "mold" refers to the physical components which make up the molding surface (cores, cavities, neck rings, gates, lock rings, etc.), the shoe which holds and actuates the molding surface (core plate, cavity plate, stripper plate, slides, etc.)
2. The "injection molding system" refers to the machinery and mold which, together, convert resin into an injection-molded object, particularly a preform. Such components could include, but are not limited to the injection molding machine, including its affixed enclosure, the mold and all its components, product handling systems, robots and their enclosures
3. For the purposes of this application, "completion of injection molding" refers to a physical and thermodynamic state of the injection molded part wherein the shrinkage of the part is essentially complete, and the bulk temperature of the part is essentially at room temperature.
4. Crystallization" in reference to a specified region of the injection molded part, may indicate a homogeneous partial crystallinity, a layer of crystallinity within or at the surface of the object, or complete crystallization.
5. In-Mold" refers to processes which occur within the physical mold during and/or after injection, but before the physical mold has been opened.
6. Post-Form" refers to processes which occur within the confines of the mold after the mold has been opened; this may involve a movement of the part to another station within the mold with subsequent additional processing, or may involve the introduction of external conditioning systems into the mold; the mold may then be re-closed for further processing of the molded part.
7. Out-of-Mold" refers to processes which occur outside of the physical mold, but within the injection molding system; this may occur in a post-injection cooling station or a product handler, but occurs before the injection molded article achieves a bulk temperature of essentially room temperature.
8. The term "Multi-Injection" refers to processes which may involve simultaneous or sequential co-injection, inject-over-inject, or insert molding
9. "Neck Finish" or "Neck Finish Region" may refer to any part of the preform starting at or near the annular opening of a preform, and ending at any of: the end of the thread region, the top of the support ledge, any position along the support ledge, or any position on the preform within 10 mm below the support ledge. The finish may include any physical geometries included within the region, such as threads, index or pull-up marks, child-resistant or tamper-evident features, snap-beads, etc.

IN-MOLD CRYSTALLIZATION

In a preferred embodiment of the invention the article having amorphous and crystallized portions is entirely formed before opening the mold. This is called in-mold crystallization process In order to control and adjust the amount of heat and the thermal profile of the melt during the transition through the crystallization region in a specific portion only, such as for example the neck region of a preform, several innovative passive and/or active means are introduced for either slower cooling, local heating, local thermal insulation, or any combination of them.

In a preferred embodiment the mold is temperature conditioned using the heat-pipe principle (see "Heat Pipe Science and Technology", by A. Faghri, ed.: Taylor & Francis 1995). Heat pipes are known in the art and work as active coolers and/or heaters. An example for molding applications is disclosed in the U.S. Pat. No. 4,338,068 which is herein incorporated by reference. The heat pipes provide either effect to the desired regions, or could alternate the delivery and extraction of heat from selected regions, such as the neck ring mold component or the injection core component as needed. The control of such alternating sources could be delivered by known means such as a direct constant source, by PLC or other programmable controllers, or by feedback. According to the current invention, heat pipes located around the neck portion of the mold (not shown) are used to slow down the cooling process in this region to allow formation of a crystalline neck.

According to another preferred embodiment of the invention passive thermal insulation on the neck rings or cores may be in the form of a cast or inlaid material at or near the molding surface. This insulation may consist of a single material such as ceramic or mica, or may be in the form of several materials such as ceramic, mica, heat-resistant plastics, etc., with a combined thickness of 0.1 mm to 10 mm. Insulation may have a static insulative value, or may be alterable by changing its physical or chemical characteristics.

Surface breaks in the structure of the mold elements may be also used as thermal insulators either alone, or in conjunction with other insulative materials, thereby adding additional insulation value, or a channel for controlled heat dissipation (i.e. if the thermal breaks constitute grooves or controlled voids beneath the molding surface which provide controlled conductivity paths for the heat transfer to/from the molding surface).

The temperature profile within the desired region can also be adjusted through the use of thin-film heaters appropriate for molding applications. Thin-film heaters may be used to provide a constant or controlled thermal profile within the are to be crystallized. In the case of the PET preforms, they are located near the neck ring or core region. By adjusting the delivery of heat to the injected part, one can accelerate the crystallization process.

Thermal conductors can be also used which may form the molding surface, or be beneath the molding surface of the mold component. In a similar fashion, conductors such as beryllium-copper, forming a layer of 0.1 to 7.5 mm thick could be used to provide a controlled removal of heat from areas where you would want a lesser degree of crystallinity, or where you may be delivering excessive heat as a by-product of another means. Such conductive materials could be applied or formed by several techniques, including casting, press-fitting, roll-forming, chemical bonding or mechanical fastening. Thin-film heaters and thermal conductors can be used both during the injection-molding phase, and during subsequent post-form and out-of-mold processing.

Thermal profile control for the preform, will result from the ability to control the heating/cooling cycle of the neck ring molding surface. Another means of controlling the thermal profile for this region is the provision of separate heating and cooling supplies which enter the neck rings. Typically, the cooling for the neck rings is provided from cool fluids, commonly water, flowing through the actuating slides or other neck-ring opening device. Heating of the neck rings is not commonly done because it extends the cycle time, and has no beneficial effect on a preform for non hot-fill applications. A further problem with heating of the neck rings via the slides has been the thermal distortion and seizing of the slides during actuation. To remedy this problem, heat sources for the neck rings must involve alternate sources. As indicated, thin-film heaters are one source, another is the use of common cartridge heaters which can be cast directly into neck rings, inserted into machined pockets within the neck ring, or insert-molded into the neck rings. A further option would be the use of a heated thermally-conductive fluid, such as water or oil, which is not carried directly through the slides. An embodiment of this method would be plumbing by hose or pipe along the back spine of the slide, but insulated from the slide, or from the stripper plate.

Effective adjustment of the thermal profile of the neck region will require heaters of the neck ring, and of the core as well. Several methods of insulating and heating the core have been indicated previously, which apply primarily to the molding surface or the material directly beneath it. Within the core component is typically a bubbler or cooling tube which conveys a fluid, commonly water or oil, from a source, up to the tip of the core (inside), and down the region between the core's inner diameters and the cooling tube's outer diameter, or conversely. By means of a multi-fluid-conveying cooling tube, the body of the preform can be cooled from the inside as per usual by chilled water or other fluid, while the neck region can be thermally controlled from the inside by introducing a heated fluid such as oil or water to a limited region. (ref. prior art from R. J. Abramo & Associates; oil, water, air). Such a bubbler tube could also contain or have affixed an insulator which would provide a thermal separation zone on the preform. The bubbler tube, or a part of it such as a sleeve or diaphragm, may move longitudinally in order to control the flow (heating & cooling) within the core. In this way the heating can be increased, decreased, or alternated with a cooling fluid, thereby adding a cooling cycle to the desired region after substantial crystallization. This cooling is needed to prevent distortion of the neck finish geometry which would affect the characteristics of the finished bottle, including closure function. Such a multi-fluid cooling tube, or part thereof, could also be used in conjunction with an out-of-mold or post-form conditioning station. In this instance, the preform could receive thermal controls both at the inner surface and at the outer surface while the body receives additional cooling.

POST-FORM IN-MOLD CRYSTALLIZATION

According to the current invention, if the local crystalline level in the molded part does not meet the desired depth or percentage levels in the mold closed position, the crystallization process initiated in the mold closed position can continue in various ways after opening the mold. The following methods can be us-ed to resuming crystallization once the mold has been opened.

A first method involves the transfer of the preform to an in-mold conditioning station wherein the molding surface for the neck region may or may not also transfer while in contact with the preform. During this phase of the molding process, the preform body does receive cooling to reduce its bulk temperature, but may receive localized cooling toward the neck finish/body interface to act as a heat-sink to prevent crystallization of the body portion via waste-heat from the neck region. A first version of this process would involve the preforms being transferred by relocation of the neck rings, or the molding surface portion thereof, to a parallel location within the mold, possibly by the relocation of the slides or a portion of the stripper plate. At this new location, the heating/cooling circuit would be activated to provide a heating supply to the neck ring mold surface. The temperature of the molding surface would be increased to a higher point within the $T_{CR}$ region (see FIG. 10) to accelerate crystallization, or would be maintained to continue the crystallization rate. Upon complete or partial crystallization of the neck region, neck finish region may be cooled to the point of dimensional stability, and subsequently the preforms would be removed from the mold by a separate product handling device wherein further crystallization and cooling may occur.

A second method under this process would involve the preforms being transferred to another location within the mold, without the benefit of continuing contact with the original molding surface. While in the new in-mold location, a device which would add heating/cooling and insulation as needed to the neck region and body interface would engage the preform. This device could be an integral part of the mold, such as a set of secondary neck rings with various heating/cooling methods possible, or a separate device which is delivered into the mold, such as robot system or part thereof, particularly the product removal system. This device would control the thermal profile of the neck region as desired, thereby controlling the crystallization of the neck region. This device may act as cooling source for the preform body providing that the device is not integral to the mold, and is removed from the mold when the crystallized preforms are removed (prior art from EFI, above). In either instance, with or without neck ring transfer, the mold may re-close while the preform necks, are crystallizing, thereby allowing injection-molding of another set of preforms while the crystallization occurs on the preforms from the previous injection cycle(s). There may be several alternate locations within the mold to which any specific preform can be transferred, thereby allowing the crystallization to occur over several cycles.

Another embodiment of post-opening in-mold crystallization would involve the preforms being retained in the original molding cavity while the core and neck molding surfaces are removed, thus exposing the neck finish. A device which is either integral to the mold or introduced to the mold would encompass the neck finish, inside and outside, and provide the heating, cooling, and insulation as needed to control the crystallization of the neck region while protecting the body region from adverse heating effects. This device (if initially external to the mold), or another device may enter the mold to remove the preforms when crystallization is at least partially complete. The device may remain in place, crystallizing the neck region of preforms, for several injection cycles.

As indicated previously, it is desirable to attain at least partial-crystallinity while within the confines of the original neck molding surface, thereby obtaining preferable neck finish geometries. A further method which utilizes this intent is the relocation of the neck ring or at least the molding surface thereof, along with the preform, to an out-of-mold conditioning station, such as a product handling system. This method could then provide cooling to the body region, thermal isolation between the neck and body regions, and the necessary heating and cooling services to the neck region. The capacity of this crystallization system could be increased by the use of multiple product handling systems.

Taking advantage of some inherent process capabilities contained within some injection molding machines, such as multi-face mobile platens, see U.S. Pat. No. 5,728,409, and continuous conveyor systems, allows post-form crystallization. Particularly, where the moving platen of the injection machine is multi-faceted (3 or more faces) the first station is used for the injection phase and may commence the crystallization, the second (and more, if available) station is used for crystallization with or without cooling, and the final station is used for part cooling and ejection. In an embodiment where the neck ring molding surface indexes with the face to each subsequent station, conditioning technologies (heat pipe, insulation, bubbler-tube and other) described previously may be used to induce or continue the crystallization of the neck region. In an embodiment where the neck molding surface is not conveyed with the preform, a conditioning station which is integral to the machine, or introduced by an external device, may enter and provide the conditioning services as discussed above for second and subsequent stations as needed. In an embodiment involving a conveyor-style injection molding system, the preforms may be conveyed along a pathway on the original molding cores, with or without the neck ring molding surfaces. During the conveyance from injection to ejection stations, the preforms may be acted upon by conditioning stations which are part of the machine. At the end of the conveyor, the parts may be ejected to product repository or to a part handling system.

Conditioning stations which may be part of the injection machine, part of the product handling system, or introduced to the injection molding system by an external means, may provide the means of controlling the thermal profile of the neck region from both inside and outside of the preform. Quartz halogen, or other heating lamps, bands or devices, or electromagnetic and microwave sources, may be contained within such a station. When such heat sources are activated, they will provide additional heat to the desired region to continue or accelerate the crystallization. If a cooling source is located at the same level, or behind the heating source, such a source can provide cooling to the desired region once the heat source is deactivated, and such cooling source may also act to cool the heating device itself to prevent over-heating and failure.

Another mechanical embodiment of the post-form process involves using of a known shuttle mold which is mobile either by movement of the platen or of the mold shoe itself. In this way, the mold (hot or cold half) is relocated after injection and unclamp, allowing a conditioning station integral or introduced to the mold to act on the preforms while the mold may be re-clamped for injection of another set of preforms.

OUT-OF-MOLD CRYSTALLIZATION

According to the current invention, upon completion of the injection phase, wherein crystallization may have been initiated, and upon completion of any subsequent post-form processes within the mold, crystallization may be further continued outside of the mold, but within the injection-molding system. Specifically, the preforms may be transferred without any original molding surfaces to another station outside of the physical mold. Such transfer could be accomplished by a product handling system, or other mechanical or pneumatic system. When in the out-of-mold station within the molding system, the preforms may receive localized heating by means described previously, thereby facilitating crystallization of the neck region. This station may also be used to perform post-form and post-crystallization cooling of the body and thread regions as needed.

MULTI-INJECTION AND INSERT-MOLDING CRYSTALLIZATION

Thin films of PET (0.1–2.5 mm thick) and specific grades of PET, such as homopolymers, generally crystallize at greater rates and lower temperatures than thicker layers and copolymers. To take advantage of this characteristic of PET, alternate molding practices are possible, particularly co-injection, rim-gating, inject-over-inject, and insert over-molding.

According to one aspect of the current invention, the process of sequential co-injection may be used to deliver a readily crystallized plastic to the neck finish region while filling out the body with slow-crystallization polymer. Such a sequence could include injection of a copolymer to initially fill the body region and adhere to the molding surfaces, followed by a volume of homopolymer which would travel as a layer within the initial injection of copolymer and fill out the neck region, followed then by a volume of copolymer which would force the homopolymer into the desired neck region and complete the filling and packing of the preform.

According to another aspect of the current invention, the local crystallization methods using the heat energy generated during the molding process can be further used in conjunction with the so called "inject-over-inject" methods for PET or other plastic preforms. In this case a first material, such as virgin PET is injected into one cavity space to form a first layer. After cooling the mold, the mold is opened and the core portion including the first layer is moved into a second bigger cavity space to inject the subsequent material, that can be for example a recycled PET resin. Local crystallization of the neck portion can be done according to the current invention using any of the methods mentioned above during the injection of the first material to form the $1^{st}$ layer, during the injection of the subsequent material to form the external layers or during both injection steps.

When the molding system includes a post-mold cooling stage such as a part-handling robot, as shown for example in U.S. Pat. No. 5,447,426, or a turret mold as shown in U.S. Pat. No. 4,439,133, or further on an index mold, such as shown in U.S. Pat. No. 5,728,409, all of which are incorporated herein by reference, with active cooling of the article, the crystallization step initiated during the molding step, is optionally and desirably continued or promoted in the post-mold cooling stage as by maintaining the crystallized portion of the preform at a temperature substantially equal to the one in the mold during crystallization or sufficient to obtain crystallization in the post-mold cooling stage.

In one embodiment, PET preforms which are amorphous in the body area and have crystallized necks from melt are injection molded. Such preforms are then used to produce bottles with heat-resistant neck finishes by conventional methods of reheat-blow molding.

Injection molding systems for manufacturing PET preforms which are essentially amorphous incorporate many features to improve cooling and freeze of the molten PET before it crystallizes at high system outputs (low cycle times). These features are also used in the present invention to insure the amorphous state of the body of the preform at low cycle times.

The regions of the mold which form the neck finish of the preform, which is preferred to be crystallized, are the neck rings (or a portion thereof) and a section of the core (see FIG. 1). The thermal characteristics of these regions can be designed a number of ways to achieve the objective of fully crystallizing the neck from melt before ejecting the part. In other instances in order to reduce the cycle time, the part as removed from the mold may only have begun to crystallize, with maximum crystallinity levels achieved during the post-mold cooling stage in the part-handling robot or in a turret or index type of a mold. Thus, FIG. 1 shows a preform mold 10 including core cooling channel 12, core cooling tube 14, neck ring cooling channels 16, neck rings 18, core 20, mold cavity 22 and mold cooling channels 24 which extend circumferentially around the mold core. FIG. 1 also shows PET preform 26, mold gate insert 28 and injection nozzle 30. Core cooling channel 12 includes cooling inlet 32 and cooling outlet 34.

Molten plastic is injected into mold cavity 22 via an injection nozzle 30 through gate insert 28. Cooling channels 16, 24 of injection mold 10 and cooling channel 12 of the core 20 cool the molten plastic to the solid condition and form preform 26 in the injection mold.

Figure 9:
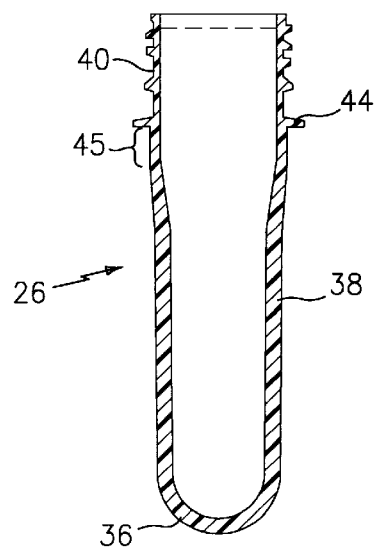
FIG. 9 shows a preform of the present invention.

Preform 26, shown in more detail in FIG. 9, includes a bottom portion 36, a sidewall portion 38 extending from the bottom portion, and a neck region 40 extending from the sidewall, with the neck region desirably including a threaded portion 42 and a neck ring 44.

Figure 2:
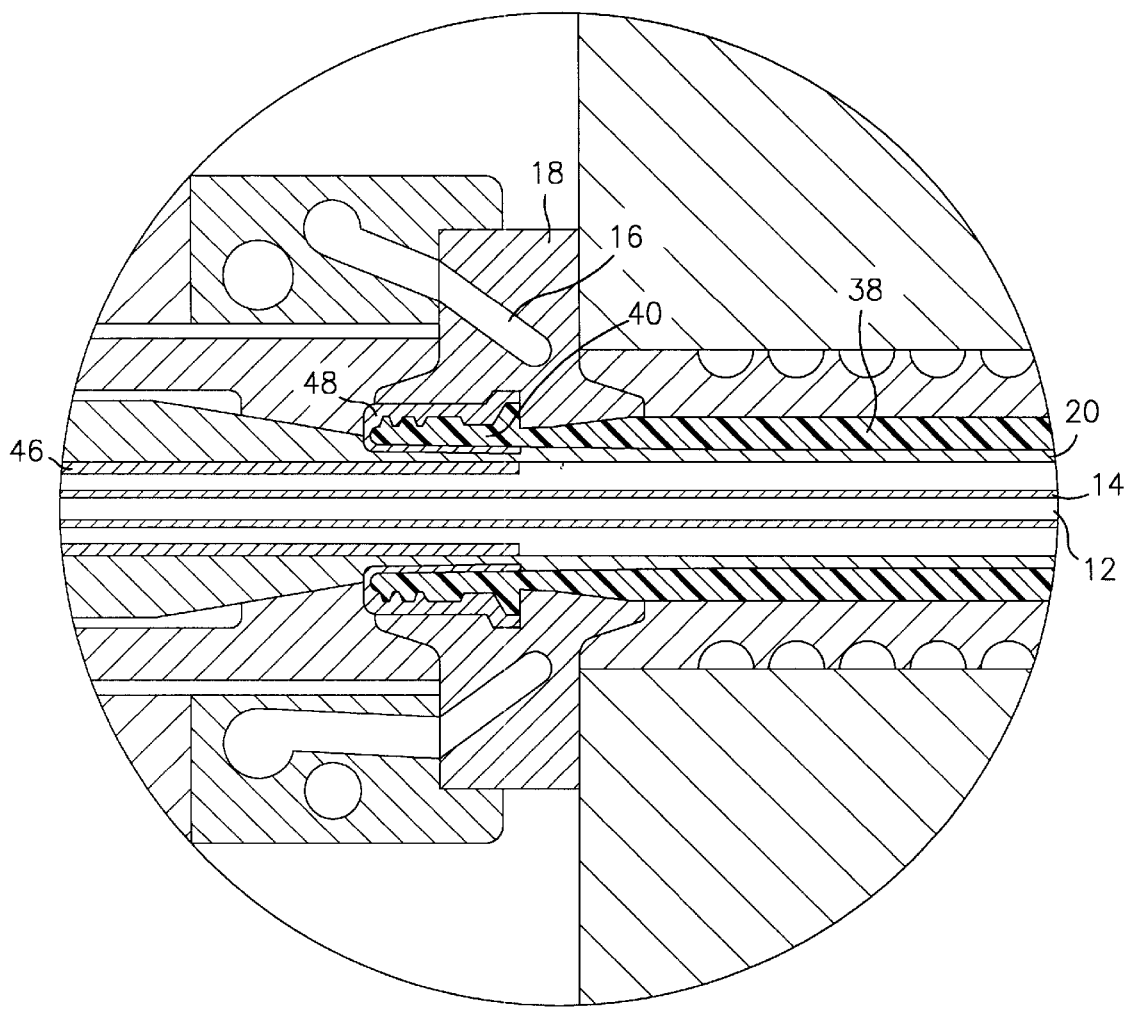
FIG. 2 is a detailed view of a preform mold according to one embodiment of the present invention.

According to one embodiment of the present invention, the hot plastic can be thermally insulated from the molding surfaces and/or the coolant in the cooling circuit in the portions where crystallization is desired. In FIG. 2, the core cooling tube 14 has an innovative thermal insulating sleeve 46 on its outer surface adjacent preform neck region 40 which extends only as far as the region of the part to be crystallized, i.e., only adjacent at least a portion of the neck region.

The insulative sleeve means 46 and 48 could be a sleeve or a layer made of insulative materials. The insulative means 46 is located inside the core and limits the cooling effect generated by the cooling fluid by lowering the heat loss. Insulative means 46 can be part of the core surface, can be part of the cooling channel surface or can be part of both of them. By using these insulation means 46 and 48 conditions are created to slow down the cooling process in the neck potion that thus can be completely or partially crystallized in the mold closed position. As shown in FIG. 2, thermal insulative means 48 is applied either on the core's surface and/or in the neck ring.

FIG. 2A shows an internal thermal insulative sleeve 14' in cooling tube 14, and FIG. 2B shows cooling tube 14 with a metal tip portion 15 and an insulative body portion 17.

FIG. 2C shows a cooling tube 14 with metal tip portion 15 and insulative body portion 17, which may also be a thin film heater, including temperature sensor 100. Core 20 may includes internal grooves 102, as shown in FIG. 2D, which may be helical having one or more beginnings. The grooves may be machined into the inner surface of the core to increase the surface of the core and create turbulent flow so that better cooling is achieved on the upper portion of the core. Thin film heater 104 may be provided, as on the outside of the core, shown in detail in FIG. 2E, which may have a sinuous construction and include a thermocouple 106.

The molding surface on the core 20 and the neck rings 18 is made of thermal insulating material 48 in the region of the part to be crystallized so as to insulate neck region 40 from mold core cooling channels 12 and from neck ring cooling channels 16. The thermal insulating materials are selected and the thicknesses of the thermal insulating inserts are designed to control the heat transfer during the injection molding cycle and permit the polymer to crystallize or begin to crystallize. Thus, FIG. 2 shows a detailed view of a preform mold 10 of the present invention including thermal insulation layers 46, 48 and core cooling tube 14. In the embodiment according to FIG. 2, which shows one embodiment of the present invention, thermal insulation means 46, 48 are employed in the neck ring and the core, i.e., in the core the insulation means may be inside and/or outside the core. In the present invention, one may employ all three insulation means shown in FIG. 2 or at least one thereof or any two thereof. The insulation means could be sleeves, for example made of ceramic or titanium, or any suitable thermal insulative layers. The thermal insulative layers can be protected by additional wear resistive layers, such as diamond-like thin films. The following are representative thermal insulative materials applied on the core and/or neck rings according to this invention.

For a sleeve:

The sleeves do not require additional wear protection layers and can be replaced if they are damaged. The sleeve can have usually a thickness of up to 1 mm.

1. Polyimides;
2. Titanium or titanium alloys;
3. Glass-ceramics

For a layer:

1. A polymeric resin selected from polyimides, polyamides, polysulfone, polyamideimides, polyetllersulfone, polytetrafluoroethylene, polytherketone. The layer can be sprayed and may have a thickness between 10–1,000 microns. A wear resistant layer is further applied on top of this insulative layer. This layer could be a "diamond-like-film" as disclosed in the U.S. Pat. No. 5,112,025 herein incorporated by reference. This layer can have a thickness of 5–20 microns.
2. In another embodiment of the invention the insulative layer is selected from the group consisting of ceramics, porcelain enamel or glass having a thickness of 20–1,000 microns. This layer can be protected by a thin metallic layer of chromium or other suitable material.
3. In another embodiment of the invention the insulative layer can be selected from known materials such as metallic oxide, silicon oxide, silicon complex oxide or plasma-polymerized plastics. As before the thickness should be up to 1,000 microns and a wear protective layer is applied on top of it.
4. A suitable insulative layer with higher wear resistance according to the invention is Zirconia ceramics. Usually it does not require additional wear protection.

They should at least be adjacent to at least a portion of the neck region 40 of the preform to slow down the cooling process. FIG. 2 also shows neck ring cooling channels 16 in the neck ring of the preform mold 10. The neck finish portion of the preform is thus crystallized from the melt after the injection step by slowing down the cooling process as caused by the above-mentioned thermal insulation means, including sleeves and/or layers, for example.

According to the current invention the temperature in the mold closed position can be locally adjusted based on the information provided by any known temperature sensors. Independent sensors are preferably located adjacent the portions where the melt is going to become amorphous and crystalline after the completion of the cooling step. In order to get the best accuracy and avoid marks on the part, the current invention discloses the use of thin-film temperature sensors known in the art (see U.S. Pat. No. 4,484,061 and U.S. Pat. No. 5,573,335 both herein incorporated by reference) on the core and/or the neck ring portions elements of a preform mold as shown herein.

Figure 3:
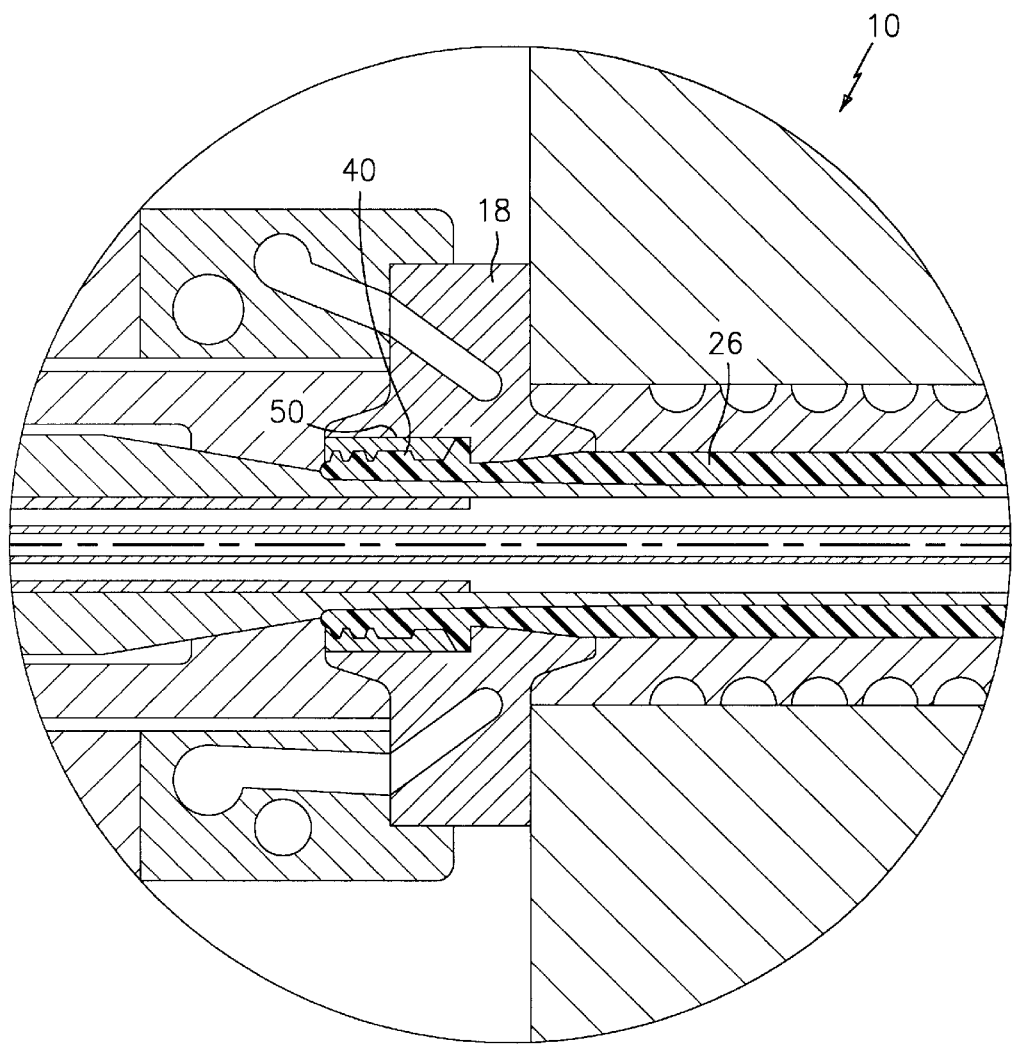
FIG. 3 is a detailed view similar to FIG. 2 of another embodiment of the present invention.

A localized region of the molding surface, such as the portion of the neck rings which forms the threads and other features of the neck finish, can be, according to another embodiment of the present invention, fitted with heating means, if desired, in addition to the thermal insulation means. The temperature of this region can then be locally thermostatically controlled to permit the polymer to crystallize or begin to crystallize. Thus, FIG. 3 shows another embodiment of a detailed view of a preform mold 10 of the present invention which includes heating means 50 in the neck region 40 of the preform 26 located in the neck ring 18 of the mold. The heating means 50 could include electric heating elements, such as coils, band heaters or heating cartridges or the like that can be switched on or off during the injection cycle. Also, the heating means 50 could be a thin film heater deposited on the neck ring and sandwiched between two thin film layers which are electrically non-conductive, i.e., which are electronic insulators.

According to the current invention, a heating element can be further located on the core to allow heating the neck portion during the cooling process so that this portion is maintained at a higher temperature that allows formation of a crystallized neck. In a preferred embodiment the heating element is a thin-film heater that may in some instances include a thin-film-temperature sensor. Thus, in accordance with the present invention, a thin-film-heater is applied at least partially on the surface of a core used to mold PET preforms. Reference is made in this regard to U.S. Pat. No. 5,573,692, U.S. Pat. No. 5,569,474, U.S. Pat. No. 5,155,340 and U.S. Pat. No. 4,396,899, incorporated herein by reference, that disclose various thin film heaters with potential application in conjunction with a mold core to form PET preforms.

Figure 3A:
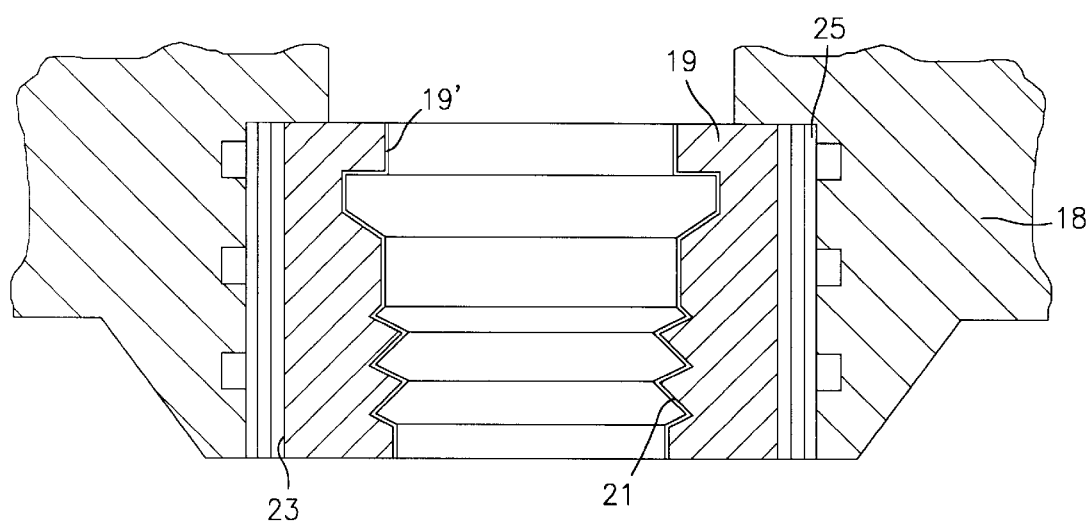
FIG. 3A shows variations.

According to the current invention, temperature sensors and heating elements made using known thin film technologies can be also used in conjunction with the neck rings 18 shown in FIG. 2. Thus, the present invention teaches heating means, thermal insulation means and/or temperature sensor means located in the neck rings that are part of a mold to form blowable preforms, for example to form polyethylene terephthalate preforms having a crystallized neck portion. As shown in FIG. 3A, the neck ring portion 18 includes according to a preferred embodiment a threaded insert 19 which has an inner threaded portion 21 and an outer surface 23. Outer cylindrical portion 23 includes a deposited thin-film-heater 25 which is made of a thin electrical resistive layer sandwiched between two layers of any known electrical insulation material, such as mica. The insert 19 is made of high thermally conductive material. In some cases a wear protective layer 19' is applied on the threaded portion of the insert 19. In other applications the thin film heater 25 is applied directly on the threaded portion 21. In this case a suitable wear resistant film known in the art is applied on to the heater.

Figure 4:
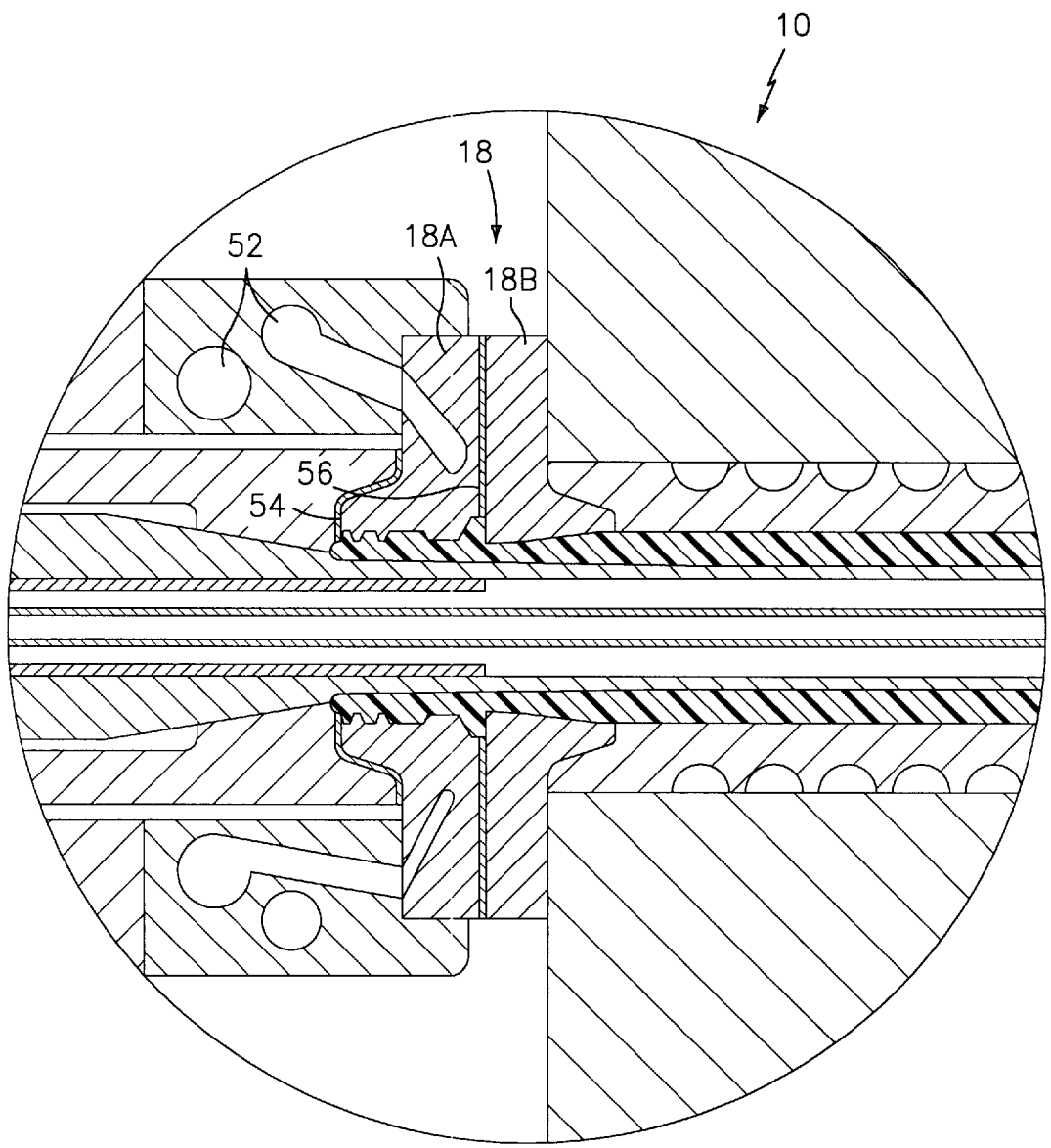
FIG. 4 is a detailed view of a still further embodiment of the present invention.

The neck rings, which typically have a circuit for coolant flow, can be designed, according to another embodiment of the present invention, with a circuit for heat transfer instead or in addition to the coolant flow. According to the invention, the heat can be also provided by a heated fluid (water, oil, etc.) that will be delivered to the neck portion only during the cooling step of the entire preform through other channels. A thermal break means between heated portions and cooled portions of the mold neck ring can be incorporated. The temperature of the heated region can then be controlled to permit the polymer to crystallize or begin to crystallize. Thus, FIG. 4 shows another embodiment showing a detailed view of a preform mold of the present invention. FIG. 4 shows neck ring 18 including heating fluid circuits 52. The two piece neck ring in accordance with FIG. 4 in mold 10 defines an upper neck ring portion 18A and a lower neck ring portion 18B thereof. In between the upper 18A and lower 18B portion is a thermal break means comprising a first thermal insulating means 54, with a second thermal insulating means 56 also optionally shown above the first thermal insulating means. The thermal insulating means could be a ceramic sleeve or a titanium sleeve, for example. Alternately, the thermal insulating means or thermal break means could be a thermal insulation layer.

Figure 5:
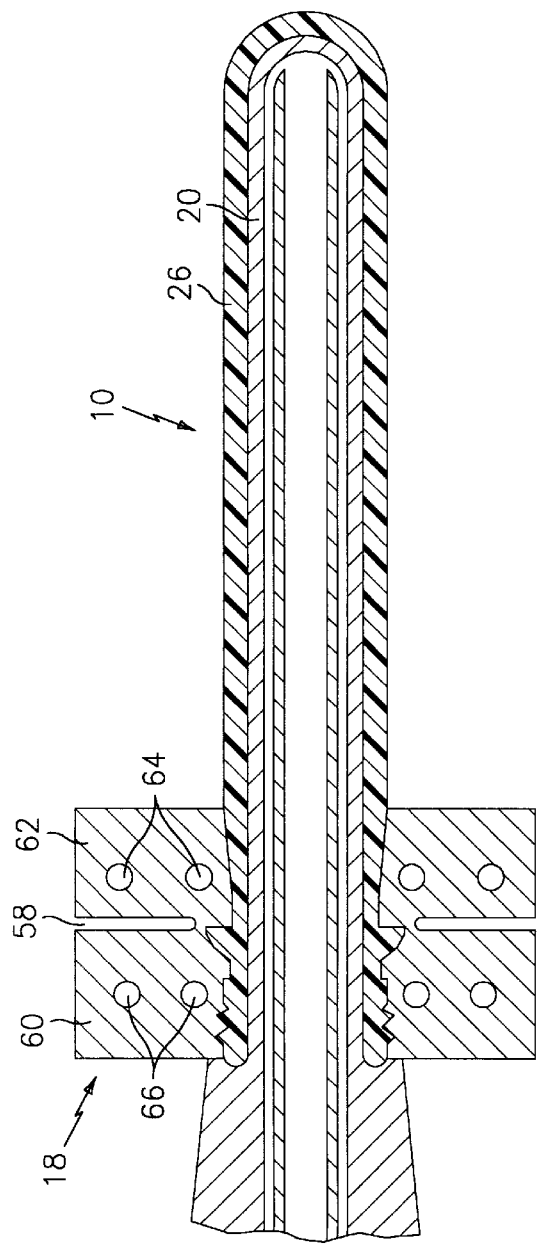
FIG. 5 is a partial view of another embodiment of the present invention.

The neck rings can be designed with thermostatically controlled heaters incorporated in them. A thermal break between heated portions and cooled portions of the mold can be incorporated. The temperature of the heated region can then be controlled to permit the polymer to crystallize or begin to crystallize. FIG. 5 is another embodiment which shows a partial view of a preform mold 10 of the present invention. In FIG. 5, neck ring 18 shows an alternate embodiment wherein the neck ring 18 includes an air insulation means 58 between a hot 60 and cold 62 part of the neck ring. The cold part 62 carries cooling circuits 64 and the hot part 60 carries heating means, such as heating circuits 66. The heating circuits could be switched to cooling circuits at the end of the molding cycle. Alternatively, the cooling and heating channels could be known heat pipes to provide heating and cooling.

Figure 6:
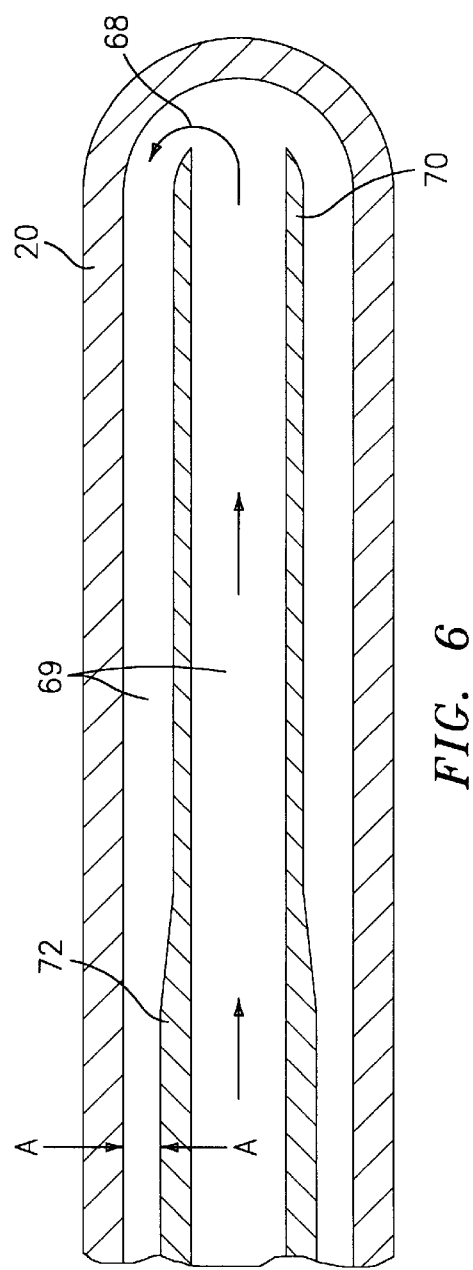
FIG. 6 is a cross-sectional view through a core in accordance with the present invention.

FIG. 6 is a cross-section through core 20 showing cooling fluid 68 which flows in cooling channel 69 from central cooling pipe 70. A core cooling restriction 72 is provided adjacent the neck area of the preform, as clearly shown by arrow A, that can be a thermal insulating means, such as a sleeve or a layer inside or outside of the core.

Figure 7:
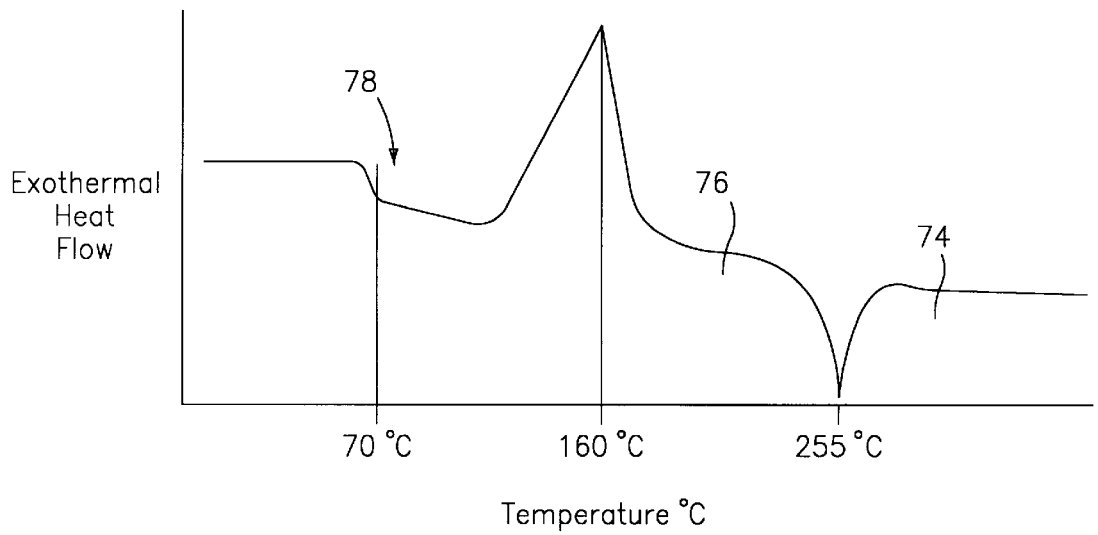
FIG. 7 is a graph showing a differential scanning calorimeter of a thermoplastic PET.

FIG. 7 shows a differential scanning calorimeter (DSC) of a thermoplastic PET material indicating the behavior of PET during the cooling process and showing a melt region 74, a recrystallization region 76 and a glass transition region 78. According to a preferred embodiment of the invention, the preform is rapidly cooled from the melt to the amorphous state in the body portion and slower cooled in the neck region.

Figure 8:
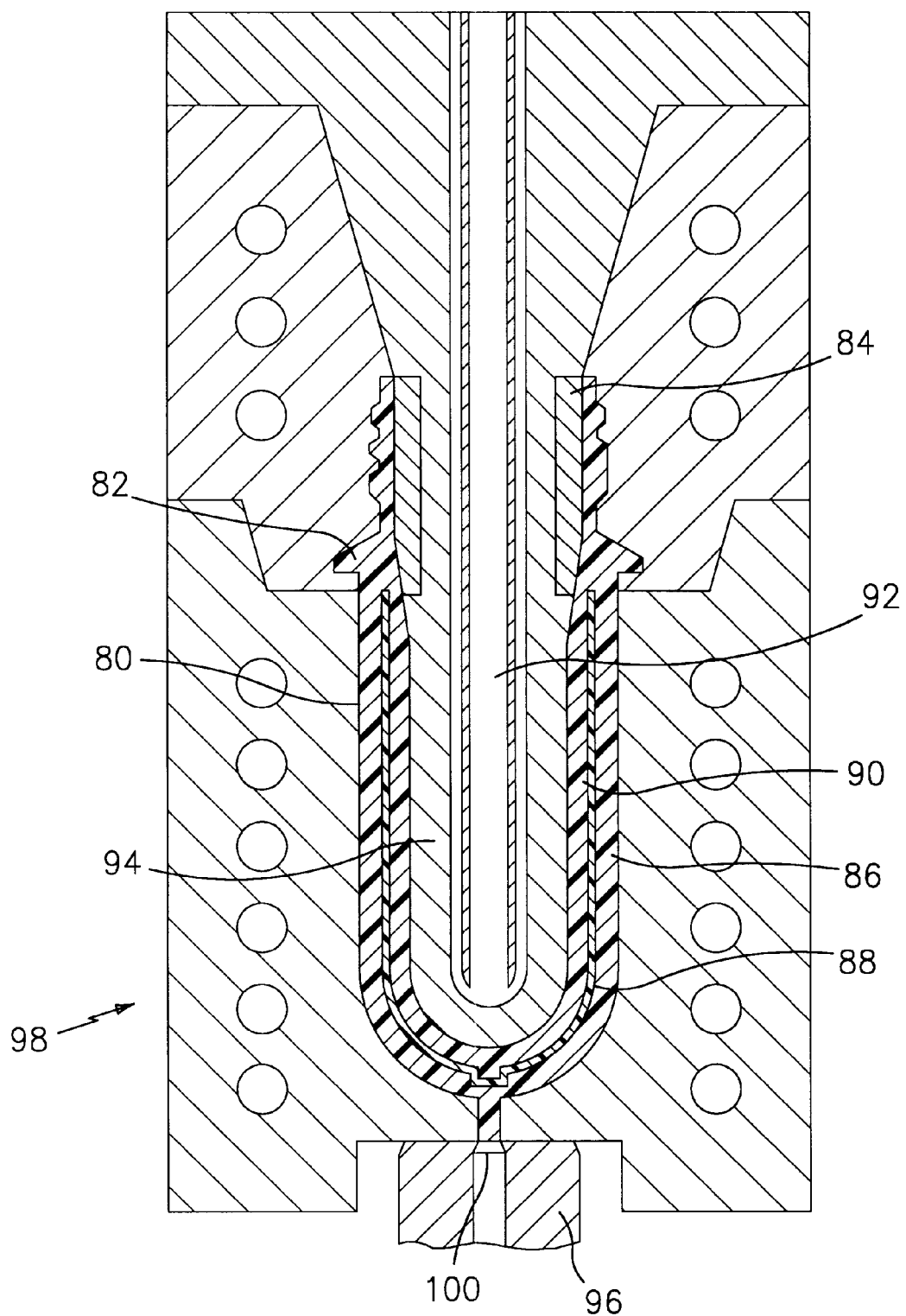
FIG. 8 shows the present invention applied to a multi-layered preform.

The present invention is applicable to multi-layer preforms as shown for example in FIG. 8, which shows a multi-layer preform 80 having a neck portion 82 to be crystallized, thermal insulation sleeve 84, first outside plastic layer 86, second intermediate plastic layer 88 and third inside plastic layer 90 with cooling channel 92 in core 94. Injection nozzle 96 is adjacent mold 98 with gate area 100 therebetween.

FIG. 9 shows preform 26 including neck region 40 to be crystallized, sidewall portion 38 and bottom portion 36.

Preform portion 45 immediately beneath neck ring 44 may optionally also be crystallized in accordance with one embodiment of the present invention. As indicated hereinabove, body region 38 and bottom portion 36 are in the amorphous condition.

Figure 10:
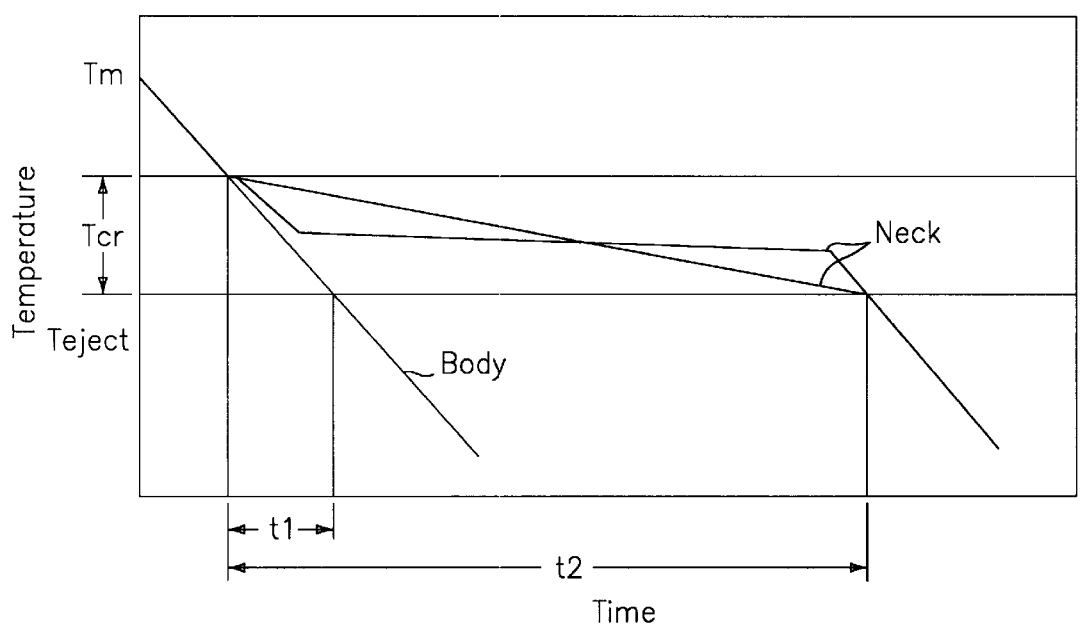
FIG. 10 is a graph showing the change in bulk temperature for the body and neck regions of the preform.

FIG. 10 shows the change in bulk temperature for the body and neck portions of the preform after filling the mold. In FIG. 10, the following abbreviations have the following meanings.

$T_m$—temperature of the plastic when it fills the mold.

$T_{cr}$—is the range of temperatures wherein the plastic crystallizes most rapidly.

$T_{eject}$—is the temperature range at which the part can be ejected and includes the highest temperature at which the part can be ejected.

T1—is a time period too short for substantial crystallization to occur.

T2—is a time period long enough for substantial crystallization to occur.

As shown in FIG. 10, the neck portion may follow a number of paths within $T_{cr}$ in order to obtain crystallization of the neck region.

Table 1 below is a chart of sequence and timing events for three variations of the present invention. In the chart, the abbreviations have the same meanings as set out hereinabove with the following additional abbreviations.

S2—station 2,

NR—neck ring,

S3—station 3,

S4—station 4,

TO—take out or removal of the part from the mold without releasing the part.

tion is at least initiated within the mold prior to mold opening. It is desirable to crystallize the neck finish within the original neck molding surface wherever possible insofar as it gives the most stable dimensions for the neck geometries. In order to provide the advantages of the present invention, and desirably crystallize the neck region, one must provide means for controlling the cooling of the neck region, e.g., by heating, cooling, insulation or combinations thereof in passive and/or active form. Thus, for example, passive and active insulation and thermal breaks can readily be used during the injection molding phase or during subsequent processing either at stations within the mold or out-of-mold, such as in a product handling system. This can include the use of thin-film heaters and thermal conductors which may form the molding surface or be beneath the molding surface of the mold component. By controlling the delivery of heat to the injected part, one can accelerate the crystallization. Thin-film heaters may be used to provide a constant or controlled thermal profile within the preform neck region when applied to the neck rings or cores. In a similar fashion, one may use conductors such as beryllium-copper, forming a layer of for example 0.1 to 7.5 mm thick in order to provide a controlled removal of heat from desired areas.

The present invention may involve the transfer of the preform to an in-mold conditioning station wherein the molding surface for the neck region may or may not also transfer while in contact with the preform. Thus, for example, one may transfer the preform by relocation of the neck rings or the molding surface portion thereof to a parallel location within the mold, possibly by the relocation of the slides or a portion of the stripper plate. At this new location, the heating/cooling circuit would be activated to provide a heating supply to the neck ring-mold surface. The

TABLE 1

| | | | | | | | | |
|---|---|---|---|---|---|---|---|---|
| In-Mold | events | | | | open mold | eject part into TO | release part | |
| Body | fill | pack/cool to Tcr | cool to Teject: t1 | cool | cool | cool | | |
| Neck | fill | pack/cool to Tcr | keep in Tcr | cool to Teject: t2 | cool | cool | | |
| 5 Index | events | | | open mold | index mold to S2 w NR | index mold to S3 w NR | index mold to s4 | release part |
| Body | fill | pack/cool to Tcr | cool to Teject: t1 | cool | cool | cool | cool | |
| Neck | fill | pack/cool to Tcr | keep in Tcr | keep in Tcr | keep in Tcr | cool to Teject: t2 | cool | |
| Post-Mold | events | | | open mold NR into To | eject part w stage | conditioning | remove NR | release part |
| Body | fill | pack/cool to Tcr | cool to Teject: t1 | cool | cool | cool | cool | |
| Neck 20 | fill | pack/cool to Tcr | keep in Tcr | keep in Tcr | keep in Tcr | cool to Teject: t2 | cool | |

As shown in Table 1 above, several variations of the present invention may readily take place in order to obtain the features and advantages of the present invention.

In order to crystallize amorphous PET melt, the injection mold part must cool from the melt temperature to the crystallization region and transition through the crystallization region with a control thermal profile. The degree of crystallinity will depend on the temperature profile through the crystallization region and the time duration of the transition. Subsequent to crystallization (complete or partial) the injection molded part will cool to the ejection temperature at which time it will be removed from the physical mold. In accordance with the present invention, crystallizatemperature of the molding surface could be increased to a higher point within the crystallization region to accelerate crystallization, or could be maintained to continue the crystallization rate. Upon complete or partial crystallization of the desired neck region, the neck finish region may be cooled to the point of dimensional stability, and subsequently the preforms would then be removed from the mold by a separate product handling device wherein crystallization and cooling may take place. A second method of the present invention may involve the preforms being transferred to another location within the mold, without the benefit of continuing contact with the original molding surface. While in the new in-mold location, a device which would add heating/cooling and/or insulation as needed to the neck region and neck region-body interface would engage the preform. This device would control the thermal profile of the desired neck region as desired, thereby controlling the crystallization of the desired neck region.

Another embodiment of post-opening, in-mold crystallization would involve the preforms being retained in the original molding cavity while the core and neck molding surfaces are removed, thus exposing the neck finish. A device which may be integral to the mold or introduced to the mold would encompass the desired neck finish Inside and out as desired) and provide the heating, cooling and/or insulation as needed to control the crystallization of the desired neck region while protecting the body region from adverse heating effects.

As indicated hereinabove, in accordance with the present invention, it is desirable to obtain at least partial crystallinity while within the confines of the original neck molding surface, thereby obtaining preferred neck finish geometries. A further variation of this is the relocation of the neck ring or at least the molding surface thereof, alone with the preform, to an out-of, mold conditioning station, such as for example a product handling system. This procedure could then provide cooling to the body region, thermal insulation between the desired neck region and body regions, and the necessary heating, cooling and/or insulation services to the neck region.

It can be readily seen that the present invention has numerous variations thereof which desirably increase the versatility of the present invention.

It is to be understood that the invention is not limited to the illustrations described and shown herein, which are deemed to be merely illustrative of the best modes of carrying out the invention, and while are susceptible of modification of form, size, arrangement of parts and details of operation. The invention rather is intended to encompass all such modifications which are within its spirit and scope as defined by the claims.

What is claimed is:

1. The process which comprises:
    forming a plastic article by injecting molten plastic into an injection mold at an elevated temperature;
    cooling the plastic from the molten condition to a solid condition;
    wherein a first portion of the molten plastic is rapidly cooled from the molten condition to the solid condition by a first means adjacent said first portion to form an amorphous first portion, and a second portion of the plastic is slowly cooled from the molten condition to the solid condition by a second means adjacent said second portion to form a crystallized second portion;
    wherein said article has a closed bottom, a sidewall portion extending from the closed bottom, and a neck region extending from the sidewall, wherein said second portion includes said neck region, including the step of crystallizing at least a portion of the neck region to form a neck region where the crystallized portion thereof has a higher strength than the body region; and
    including providing a mold core of said injection mold, forming a cooling channel inside said mold core with coolant flow therein operative to cool said first and second portions, and forming a cooling restriction in said cooling channel adjacent said neck region for slowly cooling said plastic adjacent at least a portion of the neck region to form said crystallized second portion at said neck region, while rapidly cooling said closed bottom and sidewall to form said amorphous portion at said closed bottom and sidewall.

2. The process of claim 1, including the step of providing cooling means in said injection mold to cool said article, and insulating at least a portion of the second portion from said cooling means.

3. The process of claim 1, including forming a plastic preform in said injection mold.

4. The process of claim 1, wherein said plastic is polyethylene terephthalate.

5. The process of claim 1, including providing said injection mold with a mold core and a cooling tube inside said mold core, and insulating said cooling tube adjacent at least a portion of said neck region.

6. The process of claim 1, including providing said injection mold with a mold core and a cooling tube inside said mold core, and insulating said mold core adjacent at least a portion of said neck region.

7. The process of claim 1, including providing said injection mold with a mold core and a neck ring with at least one cooling channel in said neck ring, and insulating said neck ring adjacent at least a portion of said neck region.

8. The process of claim 1, including the step of providing heating means adjacent at least a portion of said second portion to heat at least a portion of said second portion to at least begin crystallizing said second portion.

9. The process of claim 1, including the step of providing a thermal break means adjacent at least a portion of said second portion to at least begin crystallizing said second portion.

10. The process of claim 1, including the step of providing a neck ring adjacent said neck region, and including the step of heating a first part of said neck ring and cooling a second part of said neck ring, and insulating the first from the second part.

11. The process of claim 1, including the step of forming a multilayered plastic article.

12. The process according to claim 1, wherein slow cooling of said second portion continue, outside of said injection mold.

13. The process of claim 1, including the step of fully crystallizing at least a portion of the neck region.

14. The process of claim 1, including the step of varying coolant flow within said cooling channel.

* * * * *